United States Patent
Sames et al.

(10) Patent No.: US 9,894,907 B2
(45) Date of Patent: Feb. 20, 2018

(54) CASING BRAKE ASSEMBLY WITH MOVEABLE SAFETY MEANS

(71) Applicant: Poly-clip System GmbH & Co. KG, Hattersheim (DE)

(72) Inventors: Jörg Sames, Alten Buseck (DE); Olaf Bienert, Waldems (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 15/585,816

(22) Filed: May 3, 2017

(65) Prior Publication Data

US 2017/0318824 A1    Nov. 9, 2017

(30) Foreign Application Priority Data

May 4, 2016    (EP) .................................... 16168439

(51) Int. Cl.
*A22C 11/02*    (2006.01)
*A22C 11/12*    (2006.01)

(52) U.S. Cl.
CPC ......... *A22C 11/0263* (2013.01); *A22C 11/125* (2013.01)

(58) Field of Classification Search
CPC ....... A22C 11/00; A22C 11/008; A22C 11/02; A22C 11/0209; A22C 11/0227; A22C 11/245; A22C 11/0263; A22C 11/12; A22C 11/125; A22C 11/0245
USPC ........... 452/21–26, 30–32, 35–37, 46–48, 51
See application file for complete search history.

(56) References Cited

U.S. PATENT DOCUMENTS

| | | | | |
|---|---|---|---|---|
| 4,031,592 A | * | 6/1977 | Schnell | A22C 11/125 140/82 |
| 4,773,128 A | * | 9/1988 | Stanley | A22C 11/0245 452/31 |
| 5,364,302 A | * | 11/1994 | Shibata | A22C 7/00 425/513 |

(Continued)

FOREIGN PATENT DOCUMENTS

| EP | 1428437 A1 | 6/2004 |
|---|---|---|
| EP | 1748696 A1 | 2/2007 |
| EP | 2692647 A1 | 2/2014 |

OTHER PUBLICATIONS

Extended European search report issued in corresponding European Application No. 16168439.4 dated Oct. 26, 2016 (9 pages).

*Primary Examiner* — Richard T Price, Jr.
(74) *Attorney, Agent, or Firm* — Fitch Even Tabin & Flannery LLP (57) ABSTRACT

A casing brake assembly and a clipping machine for producing sausage-shaped products which includes such a casing brake assembly is presented. The casing brake assembly comprises a safety means comprising at least one tubular element and at least one switch element. The at least one tubular element is arranged coaxially with the tubular support means upstream with respect to a filling direction. The tubular element is axially spaced apart and moveably arranged with respect to the tubular support means. The switch element is stationary with respect to the tubular element and arranged for interacting with at least one safety means of the production apparatus. The casing brake assembly and a clipping machine using the casing brake assembly allow a high level of security for the operator.

15 Claims, 5 Drawing Sheets

(56) References Cited

U.S. PATENT DOCUMENTS

| | | | |
|---|---|---|---|
| 6,264,541 B1 * | 7/2001 | Zerbst | A22C 11/0245 452/27 |
| 6,354,931 B1 * | 3/2002 | Klyce | A22C 11/003 452/50 |
| 6,651,705 B1 | 11/2003 | Topfer | |
| 6,964,605 B2 * | 11/2005 | Kasai | A22C 11/0245 452/32 |
| 7,306,511 B2 * | 12/2007 | Whittlesey | A23P 20/25 452/45 |
| 7,997,045 B2 * | 8/2011 | Aur Der Heide | A22C 11/0236 452/22 |
| 8,162,729 B2 * | 4/2012 | Bilowski | A22C 11/008 452/49 |

* cited by examiner

CASING BRAKE ASSEMBLY WITH MOVEABLE SAFETY MEANS

CROSS-REFERENCE TO RELATED APPLICATION

The present application claims the benefit of priority of European Patent Application No. 16168439.4 filed May 4, 2016, the contents of which are incorporated herein by reference in their entirety.

FIELD

The present invention relates to a casing brake assembly and an apparatus for producing sausage-shaped products which includes such a casing brake assembly.

BACKGROUND OF THE INVENTION

In practice, it is known that, for example in the production of sausage-shaped products, like sausages, filling material is fed by a filling machine through a filling tube of a clipping machine into a tubular or bag-shaped packaging casing which is temporarily stored on the filling tube and which is closed at its front end, i.e. the end pointing in the feeding direction of the filling material, by a closure means, like a closure clip, or by fusing this end, respectively. The tubular packaging casing is pulled-off from the filling tube while being filled by the feeding pressure.

At least during the filling process, a casing brake applies a frictional force to the tubular packaging casing while being pulled-off from the filling tube, in order to control the pull-off speed and to ensure an at least approximately constant filling degree. After a predetermined volume of filling material has been filled into said tubular packaging casing, gathering means with a first and a second displacer unit which can each be formed by a pair of reversibly moveable displacement elements, a plait-like portion of the tubular packaging casing is formed. The plait-like portion is at least approximately free of filling material. The clipping machine then places and closes at least one closure clip at the plait-like portion forming the rear end of the sausage or bag-shaped product, i.e. the end pointing opposite to the feeding direction by respective closing tools which are reversibly movable towards the plait-like portion.

EP patent application 1 748 696 discloses a clipping machine for sausages, which includes a fork-shaped holder for a casing brake. The holder has a semicircular portion formed by two arms. The casing brake of a generally circular shape has a circumferentially extending groove into which the arms of the fork-shaped holder engage for securing the casing brake in axial direction on the clipping machine. An inductive sensor is provided, which may detect a metallic component of the casing brake when in its operating position.

Even if sensor means which detect the presence or absence of a casing brake may prevent an operation of the clipping machine without a casing brake assembly being in its operating position in order to avoid the possibility that an operator can reach into the gathering means and can thus be hurt seriously, during operation of a clipping machine, there exists still the risk that an operator may grasp into moving parts of said clipping machine, like the gathering means, e.g. by entering into the circular opening of the casing brake assembly in case the filling tube is shifted away, such as for providing the filling tube with packaging casing or for adapting the clipping machine to different products, thereby involving a risk of reaching the gathering means with the fingers of an operator.

Thus, it is an object of the present invention to provide a casing brake assembly and a clipping machine using the casing brake assembly which overcome the above mentioned drawbacks and which allows a high level of security for the operator.

SUMMARY

In one aspect of the present invention, a casing brake assembly for applying a frictional force to a tubular or bag-shaped packaging casing being arranged on a filling tube of a production apparatus, like a clipping machine, which is used in the production of sausage-shaped products, like sausages, and for limiting the movement of said tubular or bag-shaped packaging casing at least while being filled is provided. The casing brake assembly comprises tubular support means for supporting leastwise one brake element. The casing brake assembly further comprises a safety means comprising at least one tubular element and at least one switch element. The tubular element is arranged coaxially with the tubular support means upstream with respect to a filling direction of the packaging casing. The tubular element is axially spaced apart and moveably arranged with respect to the tubular support means, and the switch element is stationary with respect to the tubular element and arranged for interacting with at least one safety means of the production apparatus.

By moving the safety means, more precisely the tubular element of the safety means, with respect to another element of the casing brake assembly, such as the tubular support means, the relative position of the switch element with respect to the safety means of the production apparatus changes. Accordingly, an interaction between the switch element and the at least one safety means of the production apparatus occurs. The safety means of the production apparatus preferably reacts to this interaction, such as by stopping the production apparatus or issuing a warning to the operator, and thereby increase the safety of operation of the production apparatus.

Since the casing brake assembly is adapted to be arranged on the production apparatus in a defined position relative to the production apparatus, or at least a portion of the housing thereof formed in the fixed position relative to the production apparatus, i.e. a mounting position of the casing brake assembly, the switch element of the safety means will be provided at a position, which allows an interaction with the safety means of the production apparatus. For instance, the switch element will be located next to the safety means of the production apparatus which facilitates interaction there between.

Tubular openings of the tubular support means and of the tubular element of the safety means are concentric with each other, wherein the tubular element is provided at a different axial position then the tubular support means. More precisely, since the safety means is provided upstream the feeding path with respect to the rest of the casing brake assembly, it is provided on the side of the casing brake assembly, into which the filling tube of the production apparatus is inserted and from which it is removed.

Even more precisely, upon insertion of the filling tube into the casing brake assembly, e.g. to a point inside the tubular support means and the at least one brake element, the safety means is the first element of the casing brake assembly the filling tube gets inserted through. Thereby, an object being located between the filling tube and the casing brake assembly, such as a finger or a hand of an operator, can be engaged between the casing brake assembly and the filling tube. This presents a high risk of serious injury to the operator.

Yet, since the first element to be in contact with the operator is the safety means and since the safety means is movably arranged with respect to the remainder of the casing brake assembly, contact of the operator with the safety means will result in an interaction of the switch element with the safety switch of the production apparatus. Resulting from this interaction, the production apparatus can, for instance, stop the operation of the production apparatus and thereby prevent the operator from injury. The casing brake assembly of the present invention can advantageously increase the operating security for the operator.

The arrangement of safety switch and switch element can at the same time act as the sensor means for detecting whether the casing brake assembly is mounted or not. Thereby, it can be prevented that the production apparatus be operated without the casing brake assembly, thereby assuring a higher level of quality due to less waste. Compared to solutions known from the prior art, the additional sensor means for recognizing the presence of the casing brake assembly can be omitted.

The at least one break element preferably has an at least approximately ring-shaped design such that it can apply an equal braking force to the packaging casing, preferably an equal braking force in the circumferential direction of the tubular or bag-shaped packaging casing.

In a development of the casing brake assembly, the safety means is removably attachable to the tubular support means.

Since the casing brake assembly is removably attachable to the tubular support means, the safety means can be easily cleaned and disinfected. Thereby, hygienic standards can be met.

In a preferred development, the safety means is removably attachable by means of a bayonet mount.

A bayonet mount is known as a removable connection between two elements, whereby at least two pins of a male site are inserted into two corresponding receptacles of a female side and the two elements are rotated about an axis corresponding to the axis of insertion for locking the male side, e.g. due to the pins provided on the female side, within the receptacles provided on the female side. Preferably, the mounting axis and thus the rotation axis for rotating the safety means corresponds to a central axis of the casing brake assembly, which corresponds to both the center of the tubular element and the tubular support means. Yet, also other means for removably attaching the safety means to the tubular support means.

Preferably, the safety means is provided with four pins extending downstream with respect to the fitting direction. In one further development, the arrangement of the four pins is equally distributed about the circumference of the tubular element. However, in another preferred development the distribution of the multiple pins is not equal, such that only one mounting position of the safety means with respect to the remaining casing brake assembly is possible. Thereby, an unintended erroneous mounting can be prevented.

In a development of the casing brake assembly, the tubular element is kept in a spaced apart position from the tubular support means by biasing means.

Preferably, the tubular element is kept apart substantially parallel to the tubular support means in a direction substantially corresponding to the filling direction.

In this development, the biasing means advantageously apply a separating force between the tubular element and the tubular support means, such that the gap is present between these two elements. Since the gap is present between tubular element and tubular support means, and since the tubular element is movably arranged with respect to the tubular support means, force applied to the tubular element results in a relative motion between the two elements and thus in an interaction of the switch element with the safety switch. Thereby, a safe operation by the operator can be achieved.

In a preferred development, the biasing means comprise at least one spring. The biasing means comprising at least one spring allows for a precise adjustment of the biasing force. It is preferred that the distance between tubular support means and tubular element be adjusted to be between 5 and 10 mm. This distance impedes an operator's finger from entering the gap and yet gives enough freedom for sufficient motion to result in an interaction between the switch element and the safety switch.

In a further preferred development, the distance of separation is limited by at least one mechanical stop, for instance formed by mounting pins of the bayonet mount.

In a development of the casing brake assembly, the switch element comprises a magnetic element for interacting with a corresponding element of the safety means of the production apparatus.

Since the switch element comprises a magnetic element, the motion of the magnetic element induces a variation in the magnetic field present at the safety means, in particular a safety switch, of the production apparatus which can be detected. With the magnetic element, a simple and efficient switch element can be realized. For instance, since no mechanical connection but a magnetic coupling is formed between the switch element and the safety means of the production apparatus parts, a cleaning process is facilitated.

In a development of the casing brake assembly, the magnetic element is secured in a receptacle formed in the tubular element by at least one fastening means, preferably a screw.

Preferably, the tubular element is made of one piece in which the receptacle is formed. The switch element comprising the magnetic element is secured therein, wherein the fastening means, such as the screw, are releasably provided, such that the magnetic element can be removed from the receptacle, if needed.

In a development of the casing brake assembly, the switch element is arranged on an outer circumferential side in a radial direction of the tubular element.

Since the switch element is arranged on an outer circumferential side in the radial direction of the tubular element, a position of the switch element in vicinity of the safety means of the production apparatus is facilitated. For instance, the safety means can be provided further radially outward than the switch element with respect to a central axis of the tubular element. Yet, in other embodiments, the switch element can also be arranged at a different position with respect to the tubular element.

In a development of the casing brake assembly, an inner diameter of the aperture of the tubular element is arranged to approximately correspond to an outer diameter of the filling tube.

Since the inner diameter of the aperture of the tubular element approximately corresponds to the outer diameter of the filling tube, a gap between the aperture of the tubular element and the filling tube is limited. The aperture has to be slightly larger than the filling tube such that the filling tube including the packaging casing fits therein. Yet, the gap is preferably as small as possible to impede a foreign body, such as a finger of the operator, from entering. Further, different tubular elements can be provided for different filling tubes, such that the diameters respectively coincide.

In a development the casing brake assembly comprises a brake assembly casing with at least one guiding portion for guiding the reversible mounting of the casing brake assembly to the production apparatus.

In one development, the brake assembly casing can be formed in one piece with the tubular support means. However, in other embodiments, also a separate element can be provided outside the tubular support element.

Since the brake assembly casing comprises a guiding portion for guiding the mounting to the production apparatus, a reproducible mounting position, i.e. the operating position, can be ensured. Thereby, mounting and dismounting the casing brake assembly, such as for cleaning, is possible without difficulties.

In a development the casing brake assembly comprises a connector for supplying pressurized air to at least one of the brake elements.

In this development, it is preferred that the brake elements provided to the inside of the tubular support means enclose a pressurized space therebetween. Using pressurized air within the pressurized space between the brake element and the tubular support means results in that the diameter of the brake element can be increased or reduced by increasing the inner pressure or decreasing the inner pressure, respectively. Thereby, a size of the brake element can be adapted to a particular filling tube used with the production apparatus. In this development the brake element preferably comprises an elastic material, such as rubber.

In a further aspect of the present invention, an apparatus for producing sausage-shaped products, like sausages, by filling tubular or bag-shaped packaging casings with filling material and closing said filled tubular or bag-shaped packaging casing, including a filling tube through which filling material is fed into a tubular or bag-shaped packaging casing which is stored on said filling tube, gathering means for gathering said filled tubular packaging casing and for forming a plait-like portion thereto, and a clipping device for applying at least one closure means, like a closure clip, to the plait-like portion formed on the filled tubular or bag-shaped packaging casing, is provided. The apparatus further comprises a casing brake assembly according to an aspect of the present invention, and a safety means configured for interacting with the switch element of the casing brake assembly.

Since the safety means is arranged for interacting with the switch element of the casing brake assembly, by displacing the safety means and thereby the switch element an operation of the apparatus can be influenced and thereby, for instance, stopped, in case a force is applied to the safety means due to a malfunctioning or misplacement of a part of the apparatus or an alien part, e.g. a finger of an operator.

In a development of the apparatus, the safety means of the casing brake assembly is arranged to be mounted at an operating position such that the safety means is located in proximity to the switch element, wherein the safety means is arranged to stop the apparatus, preferably by stopping a supply of pressurized air, in case the safety means is displaced from the operating position. Thereby, a secure operation of the apparatus by an operator can be ensured.

In a development the apparatus further comprises a mounting device for reversibly mounting the casing brake assembly thereto, wherein the mounting device includes a guiding means, which is adapted to reversely engage at least one guiding portion of a brake assembly casing of the casing brake assembly.

Due to the reversible mounting provided by the mounting device, the casing brake assembly can easily be mounted and dismounted from the apparatus. Accordingly, the case brake assembly can be cleaned and prepared for further use and hygienic requirements can be met.

Since the mounting device includes a guiding means, mounting and dismounting of the casing brake assembly is facilitated.

Preferably, the guiding means include a fork-like guiding element. In this embodiment, guidance is provided in the plane of the fork-like guiding element. Accordingly, only one degree of freedom, namely in the direction of the fork teeth, is permitted. Thereby, a precise and repeatable positioning of the casing brake assembly can be provided.

In a development of the apparatus, the mounting device further comprises a fixing means.

Preferably, the guiding means is pivotable with respect to a hinge and the fixing means is arranged to fix the guiding means in an operating position.

Preferably, the fixing means comprises a lever with a notch into which the nose is receivable. The nose preferably is provided adjacent to the guiding means, such as to the outside and extending further along the direction of the fork-like guiding element. In this development, the mounting device comprising the guiding means can be released from the fixing means by lifting the lever and thus release the nose from the notch. However, also other forms of fixing means for fixing the guiding means including the casing brake assembly mounted thereon in an operating position are contemplated by a skilled person.

In a further aspect of the present invention, a mounting device for being attached to an apparatus for producing sausage-shaped products, like sausages, for mounting a casing brake assembly according to an aspect of the invention thereto, is provided. The mounting device comprises a fixing means.

As an alternative to the production apparatus for producing sausage-shaped products, which includes the mounting device to which the casing brake assembly according to the present invention may be mounted, the mounting device may be provided as an upgrade part for being attached to an existing clipping machine. Thereby also in said existing clipping machine, the casing brake assembly according to the present invention may be used, providing all the above discussed advantages.

For being attachable to an existing clipping machine, the mounting device includes a fixing means. By means of said fixing means, the mounting device for the casing brake assembly may be fixed to the clipping machine, e.g. to a housing portion or a frame element of said clipping machine.

The fixing means may include any suitable fixing means for form-fit or force-fit fixing the mounting device to the clipping machine, like clamping or screwing means.

In a further aspect of the present invention, a process of controlling an apparatus for producing sausage-shaped products, like sausages, by filling tubular or bag-shaped packaging casings with filling material and closing said filled tubular or bag-shaped packaging casing, including a filling tube through which filling material is fed into a tubular or bag-shaped packaging casing which is stored on said filling tube, gathering means for gathering said filled tubular packaging casing (M) and for forming a plait-like portion thereto, and a clipping device for applying at least one closure means, like a closure clip, to the plait-like portion formed on the filled tubular or bag-shaped packaging casing, the apparatus comprising a casing brake assembly according to an aspect of the invention, is provided. The process comprises stopping the apparatus, preferably by stopping a supply of pressurized air, in case the safety means of the casing brake assembly is displaced from an operating position.

Further advantages and preferred embodiments of the present invention will be described in the following together with the drawings listed below. The expressions "left", "right", "below" and "above" used in the following description, are referred to the drawings in an alignment such that the reference numbers and the notation of the Figs. used can be read in normal orientation.

DETAILED DESCRIPTION

Figure 1:
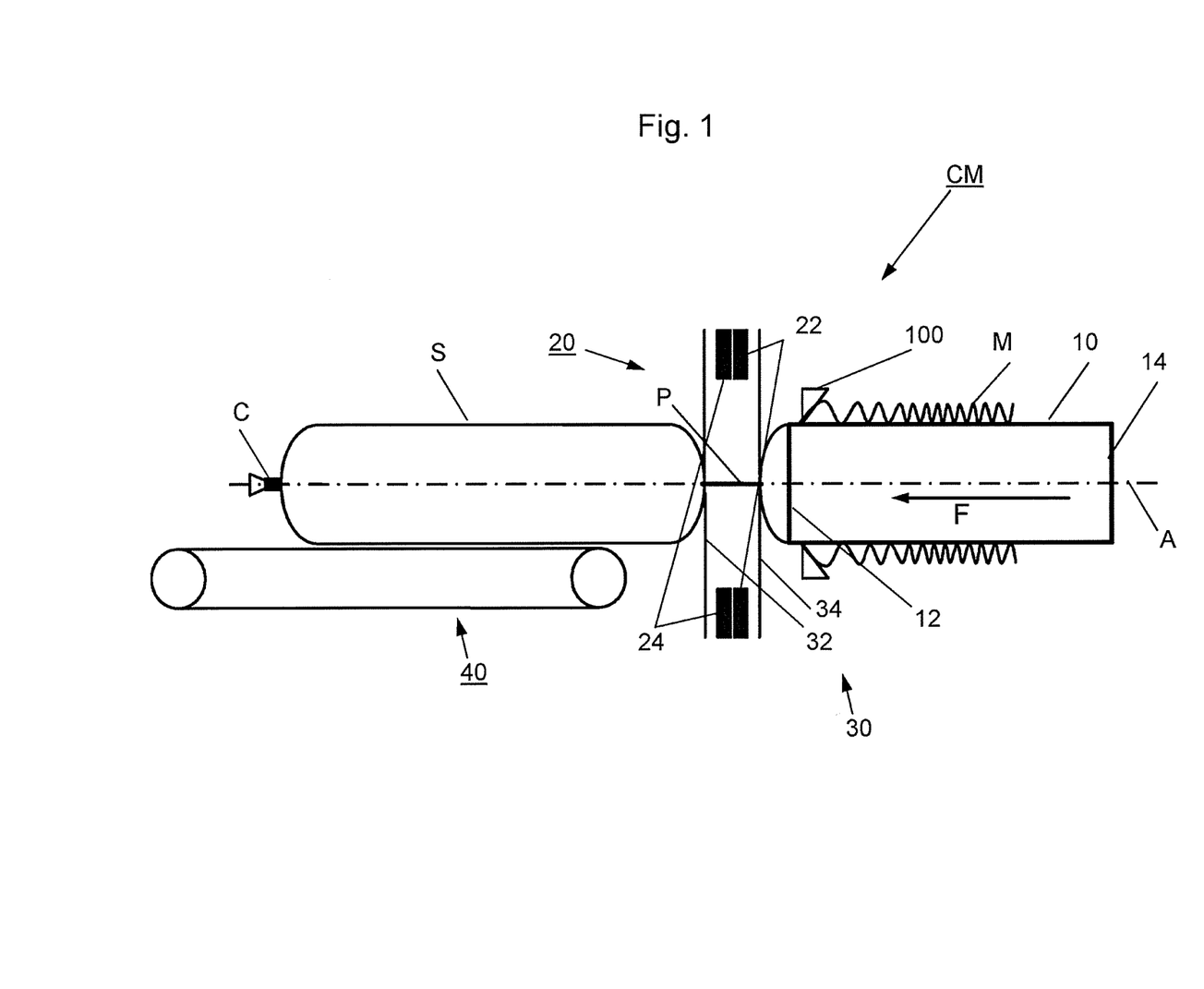
FIG. 1: is a schematic view to a clipping machine including a casing brake assembly according to the present invention.

A production apparatus or clipping machine CM for producing sausage-shaped products S shown in FIG. 1, comprises, as main components, a preferably circular cylindrical filling tube 10 having a longitudinally extending central axis A and being made of a suitable material, like stainless steel. A tubular packaging casing M made of a thin sheet material is stored on the filling tube 10. Clipping machine CM further includes a clipping device 20 and gathering means 30 for gathering the filled tubular packaging casing M and for forming a plait-like portion P thereto which are arranged downstream filling tube 10. The plait-like portion P is at least approximately free of filling material. Clipping device 20 is provided for closing the filled tubular packaging casing M by applying a closure means, like a closure clip C, to said plait-like portion P.

As further can be inferred from FIG. 1, horizontally arranged filling tube 10 has a left end 12 facing clipping device 20 and a right end 14 coupled to a filler arrangement (not shown in FIG. 1) including a pump for feeding filling material through filling tube 10 in a feeding direction F into tubular packaging casing M closed on its end facing in the filling direction F by a closure clip C.

Positioned immediately downstream left end 12 of filling tube 10, clipping device 20 is arranged and coaxially aligned to filling tube 10. Clipping device 20 comprises a first and a second pair of clipping tools 22, 24, wherein each pair of clipping tools 22, 24 includes a punch and a die. Gathering means 30 include a first displacer unit 32 and a second displacer unit 34, wherein first displacer unit 32 is positioned downstream second displacer unit 34. First and second pair of clipping tools 22, 24 of clipping device 20 are positioned between first and second displacer units 32, 34 for applying one or two closure clips C to plait-like portion P.

Furthermore, for discharging sausage-shaped product S just produced in clipping machine CM, downstream clipping device 20, a transportation device or belt conveyor 40 is arranged, comprising a conveyor belt and guide rollers. The transportation direction of belt conveyor 40 coincides with feeding direction F. The height of the upper conveyor belt section of belt conveyor 40 is aligned to the lower side of the sausage shaped product S to be produced and discharged from clipping machine CM.

Clipping machine CM further comprises an inventive casing brake assembly 100, which may be arranged on filling tube 10 in the vicinity of left end 12 of the filling tube 10 in order to control the movement or pull-off speed of tubular packaging casing M when pulled-off from filling tube 10 resulting from the filling pressure of the filling material, by applying a frictional force to tubular packaging casing M. In FIG. 1, for clarity reasons, only one ring-shaped brake element of casing brake assembly 100 is shown. The casing brake assembly 100 according to the present invention will be described in greater detail in the following.

In this example, clipping machine CM is in the form of a single feed clipping machine. Such clipping machine CM can comprise multiple filling tubes 10 that are arranged on a revolver-like hold, which are arranged to be changed after a single sausage shaped product has been filled. Each of the multiple filling tubes 10 are provided with a packaging casing M that is long enough for producing a single sausage shaped product S. However, in other examples, clipping machine CM can also be of the type comprising a single filling tube 10.

In operation of such single feed clipping machine, filling tube 10 is loaded with packaging casing M, inserted axially forward along axis A into case brake assembly 100, the packaging casing M is filled through filling tube 10 while at the same time braking forces by case brake assembly 100 apply, a closure clip C is clipped onto the sausage shaped product S, and then the filling tube 10, which does now not have a tubular packaging casing M provided on its outer surface, is retracted from casing brake assembly 100 in the opposite direction of filling direction F.

After that, filling tube 10 is changed, for instance by rotating the revolver (not shown). The displaced filling tube 10 can then be loaded again with a fresh tubular packaging casing M and be re-used.

In this example, since filling tube 10 regularly is retrieved from casing brake assembly 100, a gap regularly occurs between casing brake assembly 100 and filling tube 10. This gap is dangerous, since it exposes the aperture of casing brake assembly 100, which provides direct access to gathering means 30 and clipping device 20, which can result in serious injury if a finger or the like of an operator gets in contact therewith.

Figure 2:
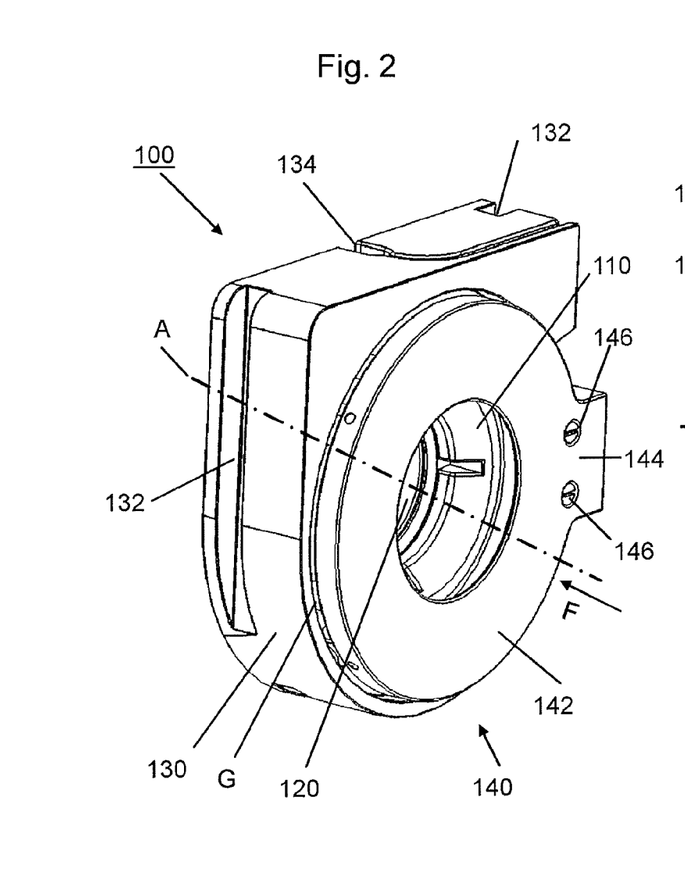
FIG. 2: is a schematic and perspective view to an exemplary casing brake assembly according to the present invention.

FIG. 2 is a schematic and perspective view of casing brake assembly 100 according to the present invention. As can be inferred from FIG. 2, casing brake assembly 100 comprises a substantially circular opening extending through casing brake assembly 100 along a central axis A, which corresponds to the central axis A of filling tube 10 when casing brake assembly 100 is mounted onto filling tube 10. Casing brake assembly 100 comprises tubular support means 110, which is in this example provided at two axial positions thereof with brake elements 120 (cf. FIG. 3-5). Brake elements 120 extend radially inward from tubular support means 110 and are arranged for applying a braking force onto tubular packaging casing M, when tubular packaging casing M is filled through filling tube 10. Thereby, and a homogeneous filling can be ensured.

Tubular support means 110 and brake element 120 are contained within brake assembly casing 130, which comprises two vertical guiding portions 132 in the form of two parallel notches for defining the position of casing brake assembly 100, when it is mounted to clipping machine CM. Brake assembly casing 130 further comprises a guiding portion 134 on its upper side for guiding a pressure hose to be connected to one of the brake elements 120 as will be described below in further detail. In this example, tubular support means 110 and brake assembly casing 130 are implemented as a single element, wherein in other examples also more than one element can be formed.

In the filling direction F, i.e. in a direction from filling tube 10 to clipping device 20 and gathering means 30, the cylindrical opening of casing brake assembly 100 begins with a safety means 140 before entering the main component of casing brake assembly 100 in which it passes through tubular support means 110. Safety means 140 comprises a tubular element 142 which is arranged substantially parallel to brake assembly casing 130 and tubular support means 110 with respect to plane normal to filling direction F.

Between brake assembly casing 130 and safety means 140 a gap G is formed. Safety means 140 is movable with respect to the rest of casing brake assembly 100, in particular with respect to brake assembly casing 130 and tubular support means 110 and is shown in its position of rest in FIG. 2. The direction of motion of safety means 140 is parallel to an axis A, which corresponds to the axial direction of tubular element 142. Any deviation from the position of rest of tubular element 142 of safety means 140 will also move switch element 144, which will bring clipping machine CM to rest. Switch element 144 is arranged within a receptacle of tubular element 142 and fixed thereto by means of two fastening means 146, which are screws in this example.

Figure 3:
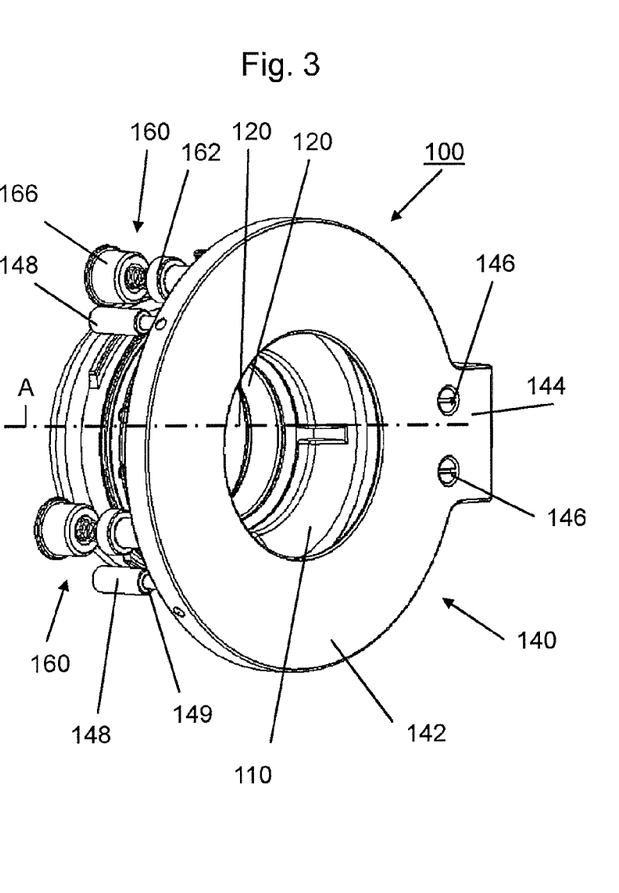
FIG. 3: is a schematic and perspective view to the exemplary casing brake assembly of FIG. 2 without a brake assembly casing.

FIG. 3 shows schematically and exemplarily a perspective view to casing brake assembly 100 without brake assembly casing 130. Due to the different angle of perspective in FIG. 3 compared to FIG. 2, two brake elements 120, which are arranged next to each other in filling direction F and concentrically around central axis A, can be seen. Tubular element 142 of safety means 140 is attached to the remainder of casing brake assembly 100 by means of four bayonet locking means 148 of which two can be seen in FIG. 3. To remove safety means 140 from casing brake assembly 100, tubular element 142 is pushed against the force of biasing means 160 and then turned counter clockwise, in order for the bayonet locking means 148 to separate from bayonet receptacles (integrated in this example within brake assembly casing 130 and thus not shown). In the assembly position shown in FIG. 3, tubular element 142 is held in place since bayonet locking means 148 are securely received within the corresponding bayonet receptacles. This assembly mechanism allows a quick and secure mounting of safety means 140 on casing brake assembly 100. However, in other examples, also other means for assembly are contemplated by the skilled person.

Biasing means 160 apply a biasing force to separate tubular support means 110 and brake assembly casing 130 from safety means 140, which in this example, acts in a direction parallel to central axis A. As a result, distance G adjusts between these components in the resting position as shown. In this example, biasing means 160 are spring supported biasing means including piston 162 in contact with safety means 140 and spring 160 arranged between piston 162 and a cylindrical support 166. In this example, four biasing means 160 are equidistantly provided in a circumferential direction. However, in other examples also more or less biasing means 160 can be provided and the biasing means 160 do not have to be provided with equal distances. Cylindrical support 166 can, for instance, be screwed to brake assembly casing 130 of safety means 140 from the rear thereof.

Gap G between safety means 140 and the rest of casing brake assembly 100 is adjusted to be preferably between 5 to 10 mm. The separating motion between these components is limited by upper limit stop 149 provided at bayonet locking means 148, which rests against a corresponding upper wall of the corresponding bayonet receptacle and impedes a further separation. As mentioned above, for separation, safety means 140 has to be pressed against the force of biasing means 160 towards tubular support means 110 and brake assembly casing 130.

Figure 4:
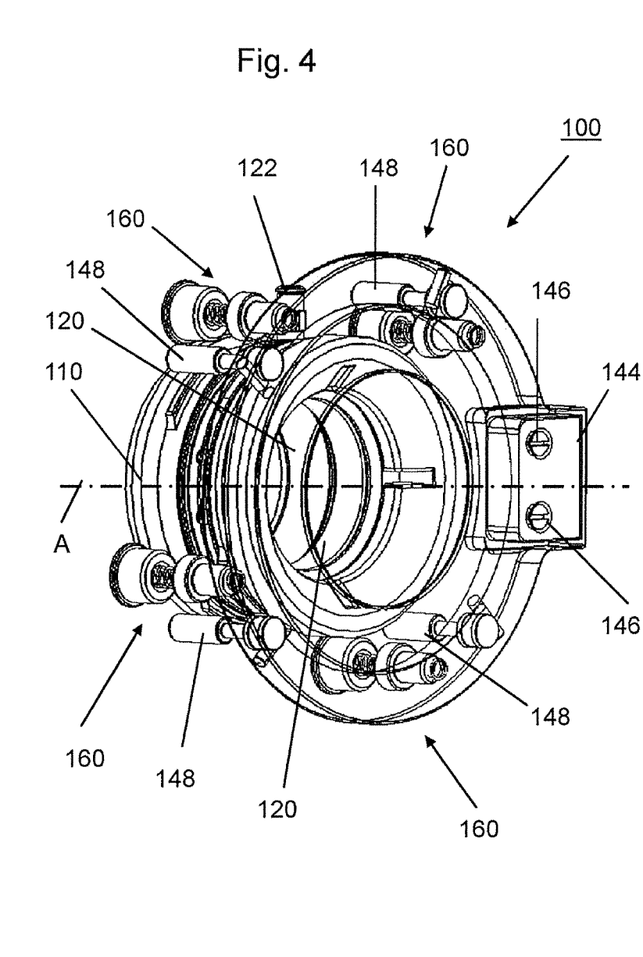
FIG. 4: is a schematic and perspective view to the exemplary casing brake assembly of FIG. 3, with some elements drawn transparent.

FIG. 4 shows the perspective example of casing brake assembly 100 of FIG. 3, wherein safety means 140 has been drawn transparent. The arrangement of the four biasing means 160 and the four bayonet locking means 148 among the circumference of casing brake assembly 100 can be seen. In other examples, also a different distribution and more or less than the exemplified four elements can be provided.

Further, it can be seen from FIG. 4 that switch element 144, in this example, a magnetic element 144, is retained within a receptacle formed on an outer circumference of tubular element 142 of safety means 140. Magnetic element 144 is retained by two retention means 146, which are screws in this example. Magnetic element 144 is arranged to interact with a safety means 150 (cf. FIGS. 6 and 7), wherein a predetermined magnetic field applies to safety means 150 in an operation position of casing brake assembly 100 mounted on clipping machine CM. A displacement or deviation from magnetic element 144 will induce a noticeable change of the magnetic field at safety means 150, which can be reacted to.

Figure 5:
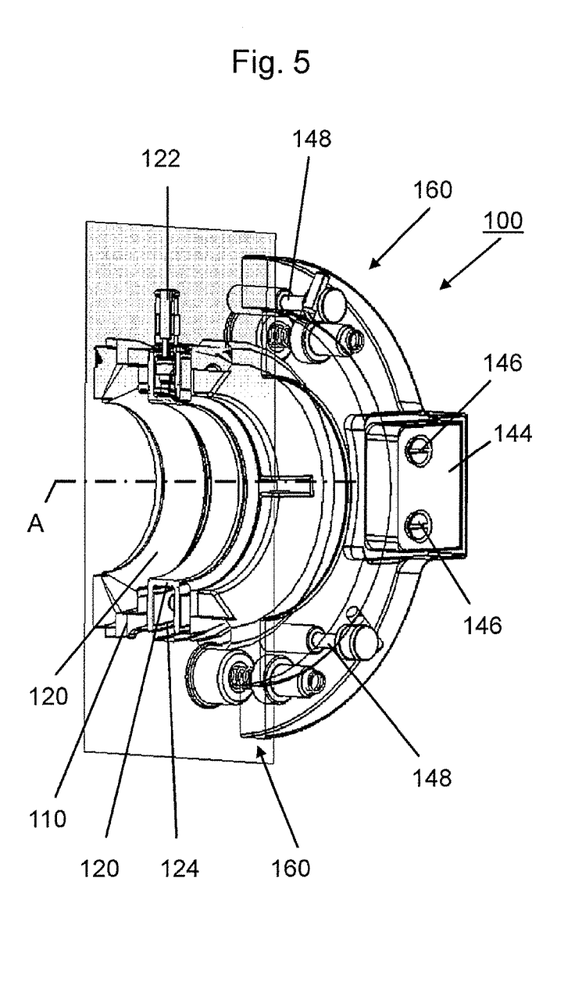
FIG. 5: is a schematic and perspective view to a segmented cut of the exemplary casing brake assembly of FIG. 4.

FIG. 5 shows the exemplary view of FIG. 4, which has been segmented along an axial plane. In this view, brake elements 120 provided to the inside of tubular support means 110 are clearly visible. To the right of brake elements 120, in other words to the brake element being upstream with respect to a filling direction of clipping machine CM, a pressurized air connector 122 can be connected which supplies pressurized air. A pressurized space 124 between preferably flexible brake element 120 and substantially rigid tubular support means 110 can be filled by pressurized air. Thereby, brake element 120 can be reduced in diameter due to the expanding pressurized space 124 and the casing brake assembly 100 can adapt to various sizes of filling tube 10.

Figure 6:
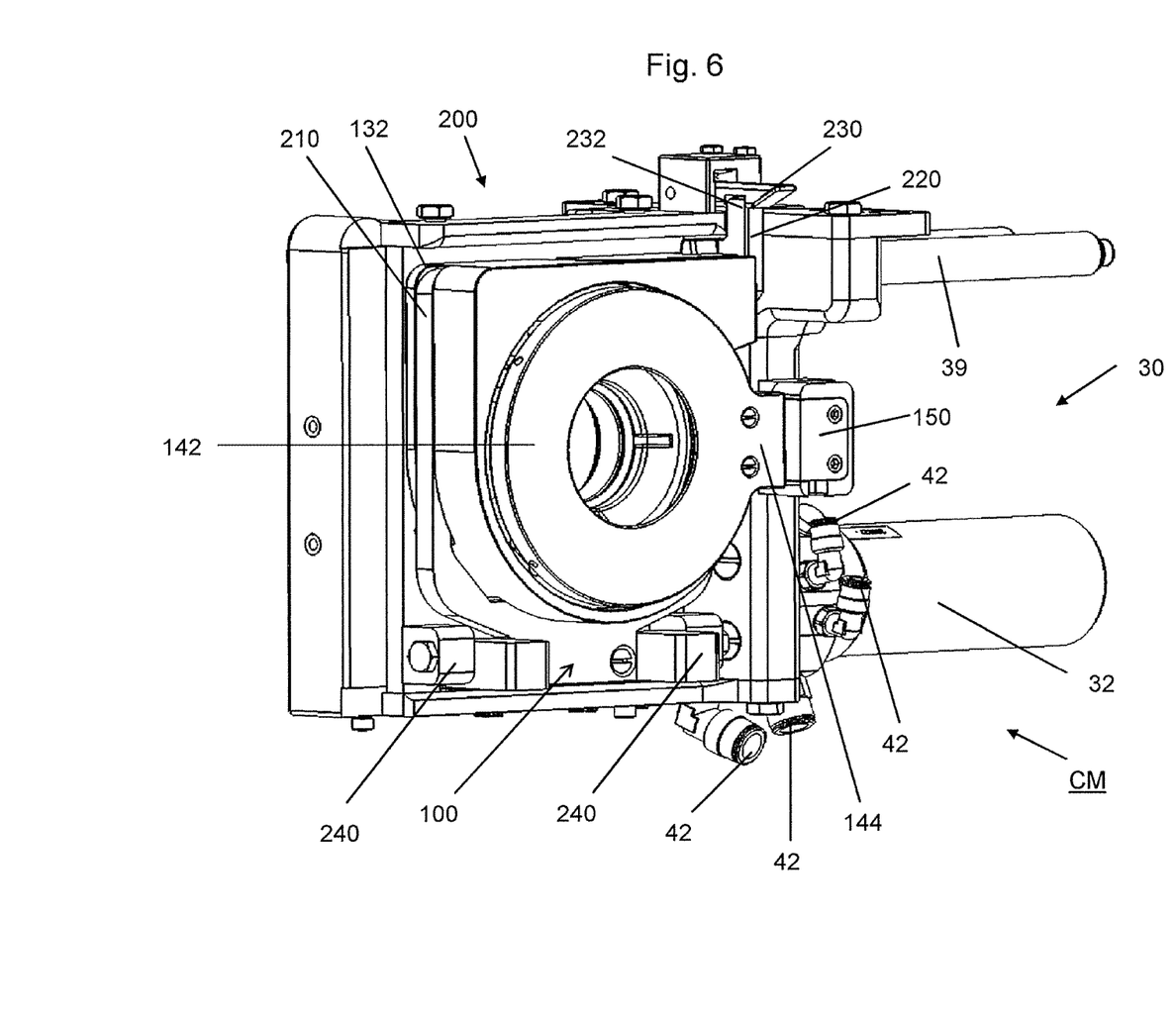
FIG. 6: is a schematic and perspective view to an exemplary mounting device of a casing brake assembly according to the present invention.
Figure 7:
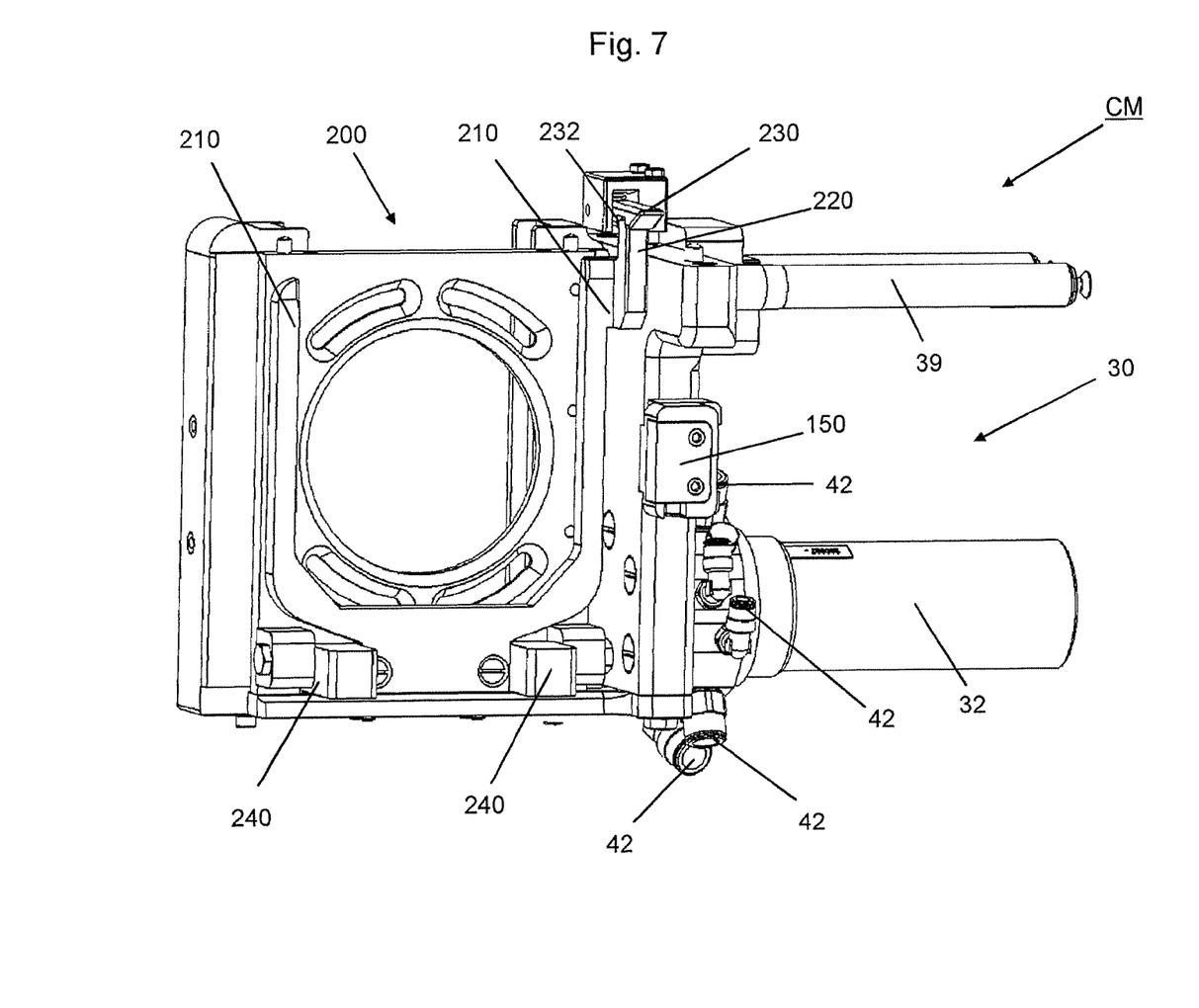
FIG. 7: is a schematic and perspective view to the device of FIG. 6 with the casing brake assembly dismounted.

FIG. 6 and FIG. 7 substantially illustrate a mounting device for reversibly mounting casing brake assembly to clipping machine CM, wherein in FIG. 7, casing brake assembly 100 is not mounted to mounting device 200.

FIG. 6 shows a perspective exemplary view to casing brake assembly 100 and mounting device 200 as parts of a clipping machine CM or to be mounted to a clipping machine CM. In this example, casing brake assembly 100 is received within mounting device 200, such that switch element 144 is in proximity to safety switch 150. In this example, safety means 150 detects the proximity of magnetic switch element 144.

In case the position of switch element 144 deviates from this mounting position, such as through pressure applied onto tubular element 142 against the remainder of casing brake assembly 100 in particular against biasing means or due to casing brake assembly 100 not being mounted at all, safety means 150 will, in this example, instantaneously stop clipping machine CM. For instance, safety means 150 can open an exhaust pressure valve such that no pressurized air for operating clipping machine CM is available. In other examples, safety means 150 can also be controlled differently, such as stopping clipping machine CM by other means.

Mounting device 200 comprises a fork-like guiding element 210, which engages with guiding portion 132 of brake assembly casing 130. On the right side as seen in FIG. 6, fork-like guiding element 210 comprises a nose 220, which does not interfere with casing brake assembly 100 and engages with a notch 232 of a lever 230, which holds fork-like guiding element 210 in place.

Lever 230 is biased downwards in the direction towards nose 220 and thus impedes an unintended release of fork-like guiding element 210 from notch 232. To mount or remove casing brake assembly 100, lever 230 is lifted against the biasing force, such as a spring induced biasing force, and fork-like guiding element 210 is pivoted to the front about hinges 240. In the hinged position, casing brake assembly 100 can be lifted such that guiding portions 132 slide along fork-like guiding element 210 until separation. For assembly, the process is reversed and casing brake assembly 100 is guided along fork-like guiding element 210, which is then pivoted towards the remainder of clipping machine CM until nose 210 latches into notch 232.

Clipping machine CM further comprises a coupling device 30 including a first linear guide rail 32 with a circular cross-section and two second linear guide rails 39 with circular cross-sections as well. In an alternative configuration, coupling 30 may comprise only one or more than two linear guide rails 39 and/or more than one first linear guide rails 32. Coupling device 30 can be used for coupling of clipping machine CM to, for instance, a machine block, or other further components of clipping machine CM, which are not shown in these illustrations.

Pressurized air can be introduced through first linear guide rail 32 and provided to one or all of air supply connectors 42. However, in other examples, also one of air supply connectors 42 can be used for providing pressurized air to the others of the air supply connectors 42.

A casing brake assembly 100 and a clipping machine CM for producing sausage-shaped products which includes such a casing brake assembly is presented. The casing brake assembly 100 comprises a safety means 140 comprising at least one tubular element 142 and at least one switch element 144. The tubular element 142 is at least approximately ring-shaped and arranged coaxially with the tubular support means 110 upstream the filling tube 10 with respect to a filling direction. The tubular element 142 is axially spaced apart and moveably arranged with respect to the tubular support means 110. The switch element 144 is stationary with respect to the tubular element 142 and arranged for interacting with at least one safety means 150 of the production apparatus CM. The casing brake assembly and a clipping machine using the casing brake assembly allow a high level of security for the operator.

What is claimed is:

1. A casing brake assembly for applying a frictional force to a tubular or bag-shaped packaging casing being arranged on a filling tube of a production apparatus which is used in the production of sausage-shaped products and for limiting the movement of said tubular or bag-shaped packaging casing at least while being filled, wherein the casing brake assembly comprises:

tubular support means for supporting leastwise one brake element, wherein the casing brake assembly further comprises a safety means comprising at least one tubular element and at least one switch element, the tubular element being arranged coaxially with the tubular support means upstream with respect to a filling direction of the packaging casing, wherein the tubular element is axially spaced apart and moveably arranged with respect to the tubular support means, and the switch element being stationary with respect to the tubular element and arranged for interacting with at least one safety means of the production apparatus.

2. The casing brake assembly according to claim 1, wherein the safety means is removably attachable to the tubular support means.

3. The casing brake assembly according to claim 1, wherein the tubular element is kept in a spaced apart position from the tubular support means by biasing means by applying a biasing force between the tubular element and the tubular support means.

4. The casing brake assembly according to claim 1, wherein the switch element comprises a magnetic element for interacting with a corresponding element of the safety means of the production apparatus.

5. The casing brake assembly according to claim 4, wherein the magnetic element is secured in a receptacle formed in the tubular element by at least one fastening means for removably fastening the magnetic element to the receptacle.

6. The casing brake assembly according to claim 1, wherein the switch element is arranged on an outer circumferential side in a radial direction of the tubular element.

7. The casing brake assembly according to claim 1, wherein an inner diameter of an aperture of the tubular element is arranged to approximately correspond to an outer diameter of the filling tube.

8. The casing brake assembly according to claim 1, comprising a brake assembly casing with at least one guiding portion for guiding a reversible mounting of the casing brake assembly to the production apparatus.

9. The casing brake assembly according to claim 1, comprising a connector for supplying pressurized air to at least one of the brake elements.

10. An apparatus for producing sausage-shaped products by filling tubular or bag-shaped packaging casings with filling material and closing said filled tubular or bag-shaped packaging casing, including a filling tube through which filling material is fed into a tubular or bag-shaped packaging casing which is stored on said filling tube, gathering means for gathering said filled tubular packaging casing and for forming a plait-like portion thereto, and a clipping device for applying at least one closure means, like a closure clip, to the plait-like portion formed on the filled tubular or bag-shaped packaging casing, the apparatus wherein:

a casing brake assembly according to claim 1, and a safety means configured for interacting with the switch element of the casing brake assembly.

11. The apparatus according to claim 10, wherein the safety means of the casing brake assembly is arranged to be mounted at an operating position such that the safety means is located in proximity to the switch element, wherein the safety means is arranged to stop the apparatus in case the safety means is displaced from the operating position.

12. The apparatus according to claim 10, further comprising a mounting device for reversibly mounting the casing brake assembly thereto,
  wherein the mounting device includes a guiding means, which is adapted to reversely engage at least one guiding portion of a brake assembly casing of the casing brake assembly.

13. The apparatus according to claim 12, wherein the mounting device further comprises a fixing means for fixing the guide means in an operation position.

14. A mounting device for being attached to an apparatus for producing sausage-shaped products for mounting a casing brake assembly according to claim 1 thereto, the mounting device comprises a fixing means.

15. A process of controlling an apparatus for producing sausage-shaped products by filling tubular or bag-shaped packaging casings with filling material and closing said filled tubular or bag-shaped packaging casing, including a filling tube through which filling material is fed into a tubular or bag-shaped packaging casing which is stored on said filling tube, gathering means for gathering said filled tubular packaging casing and for forming a plait-like portion thereto, and a clipping device for applying at least one closure means, like a closure clip, to the plait-like portion formed on the filled tubular or bag-shaped packaging casing,
  the apparatus comprising a casing brake assembly according to claim 1, the process comprising
  stopping the apparatus in case the safety means of the casing brake assembly is displaced from an operating position.

* * * * *